United States Patent
Sauvageot et al.

(10) Patent No.: US 12,048,971 B2
(45) Date of Patent: Jul. 30, 2024

(54) MANUFACTURING PROCESS AND DEVICE FOR PREFORMS INTENDED FOR BRAZING ELECTRONIC, PHOTONIC, THERMAL OR MECHANICAL COMPONENTS

(71) Applicant: ISP SYSTEM, Vic-en-Bigorre (FR)

(72) Inventors: Paul Sauvageot, Vic-en-Bigorre (FR); Thierry Garcia, Vic-en-Bigorre (FR)

(73) Assignee: ISP SYSTEM, Vic-en-Bigorre (FR)

( * ) Notice: Subject to any disclaimer, the term of this patent is extended or adjusted under 35 U.S.C. 154(b) by 249 days.

(21) Appl. No.: 17/112,199

(22) Filed: Dec. 4, 2020

(65) Prior Publication Data
US 2022/0176498 A1    Jun. 9, 2022

(51) Int. Cl.
*B23K 35/02* (2006.01)
*B22F 3/02* (2006.01)
*B23K 35/30* (2006.01)

(52) U.S. Cl.
CPC ............ *B23K 35/0244* (2013.01); *B22F 3/02* (2013.01); *B23K 35/3006* (2013.01)

(58) Field of Classification Search
CPC . B22F 7/0062; B22F 7/08; B22F 3/02; B23K 35/0244; B23K 35/3006
See application file for complete search history.

(56) References Cited

U.S. PATENT DOCUMENTS

| | | | |
|---|---|---|---|
| 4,810,672 A | 3/1989 | Schwarzbauer | |
| 2007/0183920 A1 | 8/2007 | Lu et al. | |
| 2012/0055978 A1* | 3/2012 | Schafer | B22F 1/102 228/56.3 |
| 2013/0001275 A1* | 1/2013 | Vendier | B23K 35/3616 228/248.1 |

(Continued)

FOREIGN PATENT DOCUMENTS

| | | | |
|---|---|---|---|
| JP | 2016011462 A | * | 1/2016 |
| JP | 2017-217694 A | | 12/2017 |
| WO | 2015/075122 A1 | | 5/2015 |

OTHER PUBLICATIONS

Prince & Izant; "Paste to Preforms"; https://princeizant.com/paste-to-preforms; retrieved from internet on Jan. 13, 2023; published on Mar. 18, 2016. (Year: 2016).*

(Continued)

*Primary Examiner* — Sally A Merkling
*Assistant Examiner* — Austin Pollock
(74) *Attorney, Agent, or Firm* — Oliff PLC

(57) ABSTRACT

The invention relates to a pretreatment process for a brazing composition that comprises metallic particles with a granulometry in the order of the micrometer or nanometer, one or several binders and one or several solvents, said process comprising:
a desolvation step of the brazing composition, so as to obtain a desolvated brazing composition,
then a compacting step of the desolvated brazing composition so as to obtain a preform of metallic particles, said preform being able to be used for the sintering of an electronic, photonic, thermal or mechanical component onto a substrate,
the brazing composition being represented either by a brazing paste, or by a suspension of metallic or metallic oxalate grains in suspension in a solvent.

8 Claims, 3 Drawing Sheets

(56) References Cited

U.S. PATENT DOCUMENTS

2016/0046530 A1 2/2016 Fuji et al.
2016/0288270 A1* 10/2016 Knutsson ........... B23K 35/0244

OTHER PUBLICATIONS

Merriam Webster; "Metallic", https://www.merriam-webster.com/dictionary/metallic; retrieved from internet on May 9, 2023 (Year: 2023).*

Collins Dictionary, "Desolvation", https://www.collinsdictionary.com/dictionary/english/desolvation, retrieved from internet on May 9, 2023 (Year: 2023).*

Seal S., at al.; "Nanosilver Preform Assisted Die Attach for High Temperature Applications"; University of Arkansas, 2015 (Year: 2015).*

Mccoppin J., et al.; Low Temperature Consolidation of Micro/Nanosilver Die-Attach Preforms; J. of Electronic Materials; vol. 43, No. 9, 2014 (Year: 2014).*

Masson et al., "Report de puce par frittage d'argent—mise en oeuvre et analyse," HAL, Jul. 2012, EPF'2012.

* cited by examiner

[FIG 1]
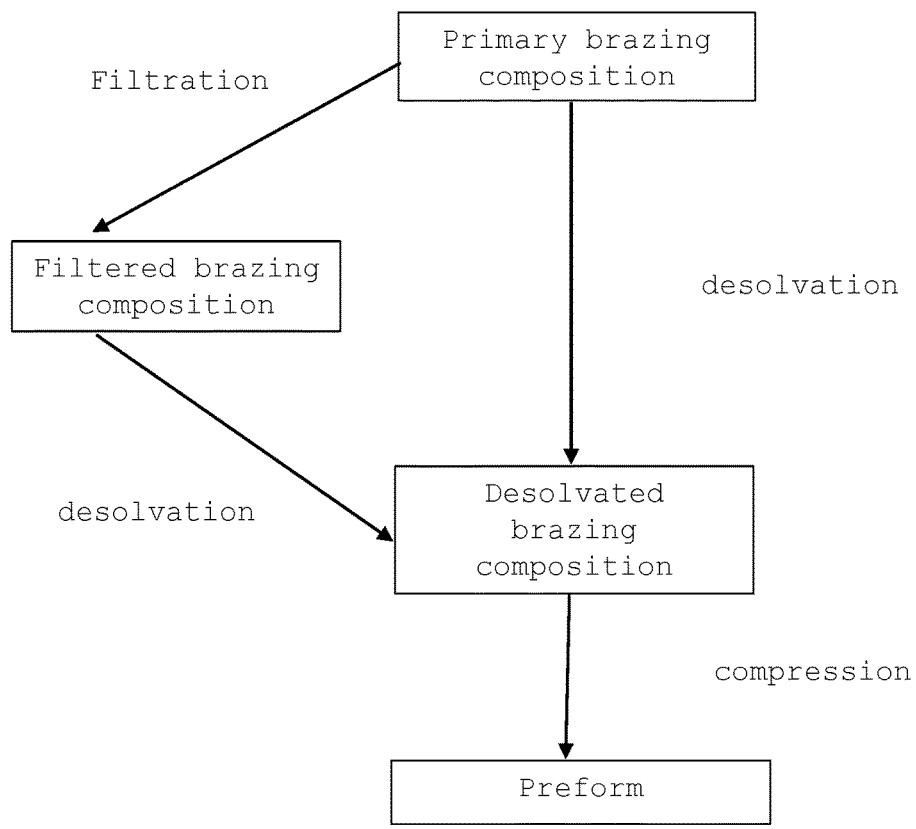
[FIG 2]
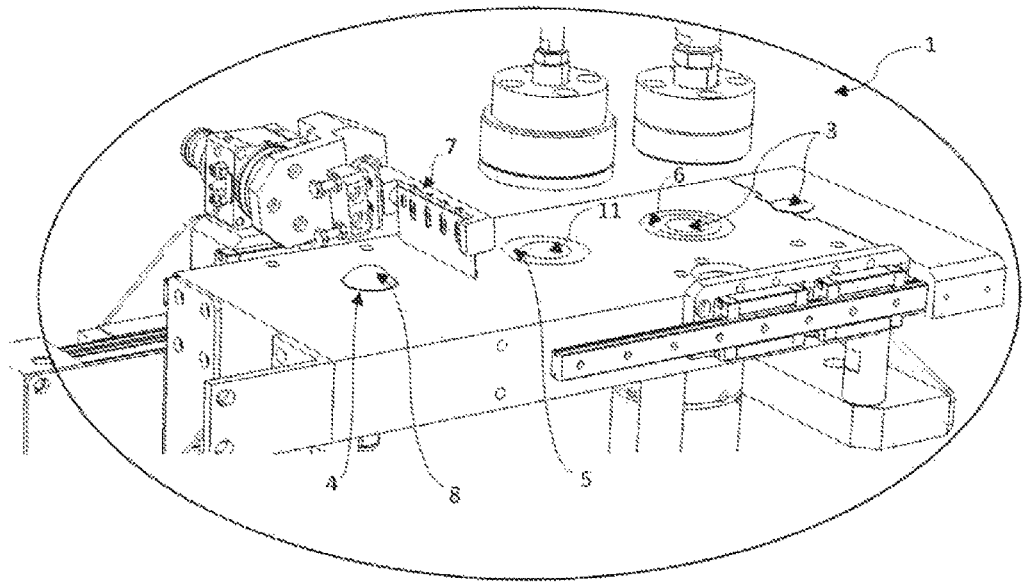

[FIG 3]
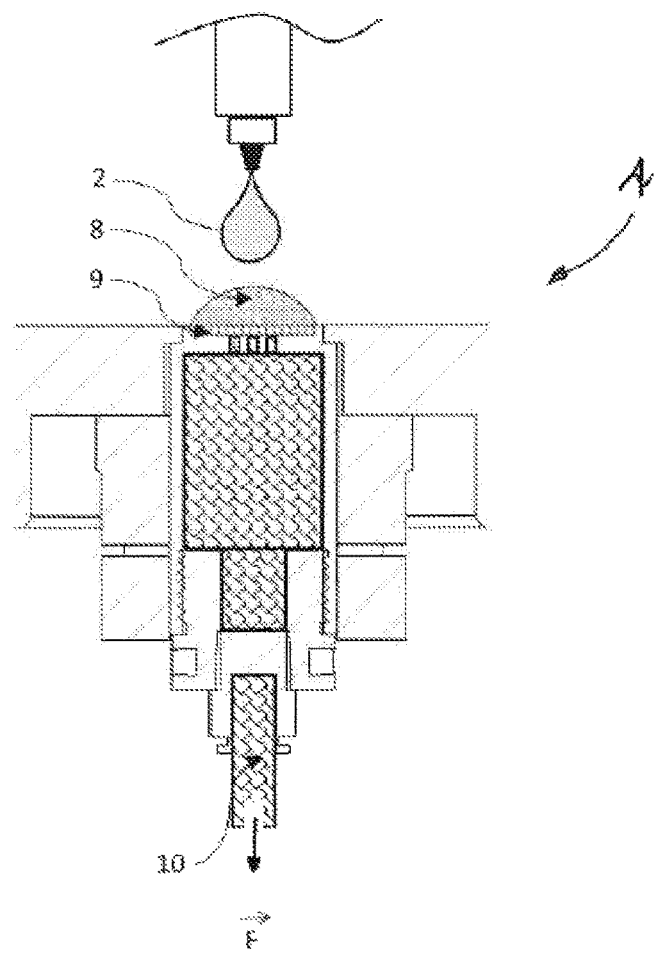
[FIG 4]
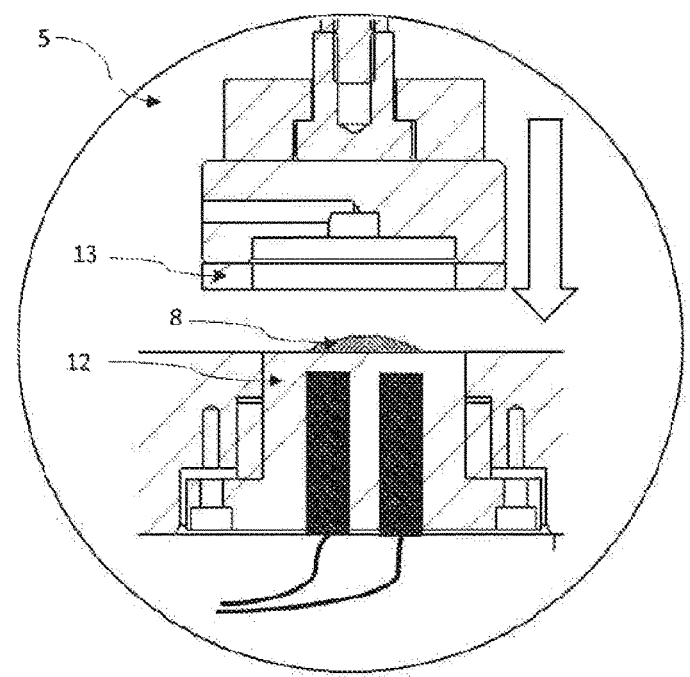

[FIG 5]
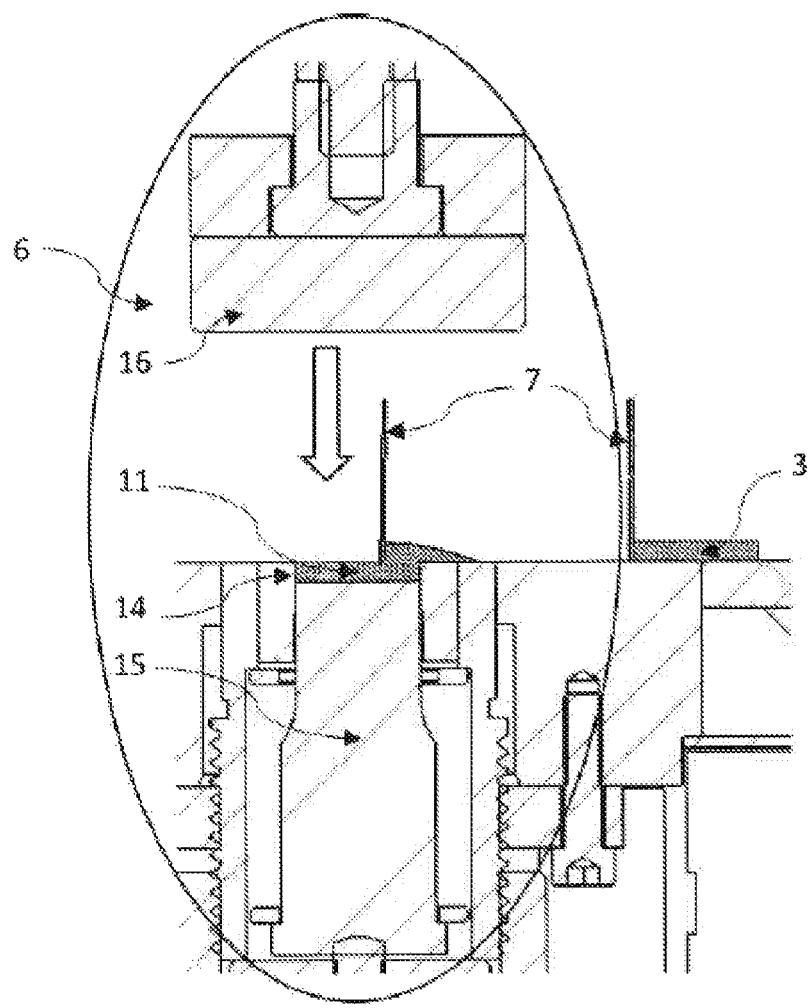

MANUFACTURING PROCESS AND DEVICE FOR PREFORMS INTENDED FOR BRAZING ELECTRONIC, PHOTONIC, THERMAL OR MECHANICAL COMPONENTS

BACKGROUND OF THE INVENTION

Field of the Invention

The technical sector of the present invention relates to processes for sintering electronic components and, more specifically, processes and devices for pre-treating compositions for sintering.

Description of the Related Art

At present, almost all electronic components, for example, are fixed to a substrate by one or more braze joints. This brazing may be obtained by the sintering of a composition of the sinter paste type between the electronic component and its substrate. These sinter pastes are often also called braze pastes although they are not strictly speaking braze pastes.

In the field of microelectronics, power electronic components, for example, are fixed to substrates by metal braze joints. The braze joint, in addition to its function as a mechanical bond, must also ensure good thermal and electrical conductivity of the component.

It is common for metallic pastes and creams or else glues to be used for brazing. These pastes are generally constituted by a mixture of solvents or binders, which are highly charged with metal particles and form a pasty mixture of more or less soft consistency.

Micrometric or nanometric metallic particles, for example silver, or metallic oxalate, for example silver oxalate, are namely used for brazing by means of a sintering process.

In this case, the metallic particles or grains of metallic oxalate may be simply dispersed in an alcohol. This composition is named metal particle suspension or metal oxalate suspension. The metallic particles or grains of metallic oxalate may also be prepared in a more sophisticated form called "brazing paste" which provides better hold in the form of a gel and makes it easier to use and store.

The implementation and use of suspensions and pastes have certain drawbacks. The high level of viscosity of the pastes may make their application by screen printing or microdrop dispensing particularly difficult. It is also common for the suspensions to block the product dispensing nozzles. Moreover, pastes and even more so, suspensions may pose decanting problems in their containers. Application may be uneven, both in density and thickness.

Before using these pastes and suspensions, it is necessary to desolvate them before carrying out the sintering process to form the braze joint. Desolvation may be performed as part of the preparatory process immediately before the sintering process. This is particularly difficult since the desolvation is performed on the substrate thus after the paste has been applied to the substrate of the electronic component and this step must be added to the component sintering process thereby making the whole process longer.

Desolvation of the primary paste may also be performed upstream of the sintering process. The metallic particles are then agglomerated in a dome shape and do not ensure that the electronic component bears evenly on the particles during sintering. This results in an adherence of the electronic component to the substrate that is not optimal. Moreover, the transportation of the metallic powder to the sintering station increases the risks of oxidation and loss of consistency of the metallic particles.

Reference may be made to article hal-00729156 dated Jul. 9, 2012 published by Amandine MASSON et al. Reference may also be made to documents U.S. Pat. No. 4,810,672 and US-2007/0183920 which describe classical brazing processes implementing silver-based brazing compositions.

The aim of the invention is to overcome the above-mentioned drawbacks by proposing a new method.

SUMMARY OF THE INVENTION

The invention relates to a pretreatment process of a brazing composition that comprises metallic particles with a granulometry in the order of the micrometer or nanometer, one or several binders and one or several solvents, said process comprising:
  a desolvation step for the brazing composition, so as to obtain a desolvated brazing composition,
  then a compacting step of the desolvated brazing composition such as to obtain a preform of metallic particles or metallic oxalate, said preform being able to be used for the sintering of an electronic, photonic, thermal or mechanical component onto a substrate.

According to one characteristic of the process according to the invention, the brazing composition is represented either by a brazing paste, or by a suspension of metallic or metallic oxalate grains in suspension in a solvent.

Advantageously, the suspension of metallic or metallic oxalate grains is subjected to a prior filtration step to filter it through a membrane filter arranged over a suction device.

According to another characteristic of the process according to the invention, the desolvation step may be performed in a vacuum and at a temperature of between 60° C. and 100° C., preferentially at 80° C.

According to yet another characteristic of the process according to the invention, the compacting step comprises the following phases:
  filling a cavity with the desolvated brazing paste or with the desolvated suspension,
  compressing the desolvated brazing paste or suspension in the cavity between a punch and a counter-punch arranged in such a way as to obtain a preform of metallic particles having a predetermined shape, thickness and density, and
  ejecting the preform of metallic particles from the cavity.

The invention also relates to the preform of metallic particles obtained according to the process.

Advantageously, the metallic particles of the preform have a granulometry in the order of the micrometer or nanometer.

Advantageously again, the metallic particles of the preform are grains of silver or grains of silver oxalate.

The invention also relates to a pretreatment device for a primary brazing paste or suspension comprising metallic particles with a granulometry in the order of the micrometer or nanometer, one or several binders and one or several solvents such as to obtain a preform of metallic particles able to be used for the sintering of an electronic, photonic, thermal or mechanical component onto a substrate, wherein said device comprises:
  filtration means able to filter the suspension of grains of silver or silver oxalate so as to obtain a filtered suspension,
  desolvation means able to desolvate the brazing paste or suspension so as to obtain a desolvated brazing paste or suspension, compacting means able to compact the desolvated brazing paste so as to obtain a preform of metallic particles, means to transfer the suspension, desolvated brazing paste or suspension and the preform of metallic particles.

According to one characteristic of the invention, the filtration means comprise a membrane filter able to receive the suspension and suction means to draw one or several binders and one or several solvents through said filtration membrane.

According to another characteristic of the device according to the invention, the desolvation means comprise a heating plate able to receive the filtered brazing paste or suspension and a retractable vacuum bell.

According to yet another characteristic of the device according to the invention, the compacting means comprise a cavity able to receive the desolvated brazing past or suspension, a punch and a counter-punch being arranged so as to compact the desolvated brazing paste or suspension in the cavity so as to obtain a preform of metallic particles of a predetermined shape, thickness and density.

One advantage of the present invention lies in the reduction of cycle times required for the sintering of an electronic component.

Another advantage of the present invention lies in the production of preforms of metallic particles comprising few or no other compounds.

Yet another advantage of the present invention lies in the production of preforms of metallic particles having good mechanical strength.

Yet another advantage of the present invention lies in the supply of preforms of metallic particles enabling the brazing height to be perfectly controlled during the sintering of electronic components.

Yet another advantage of the present invention lies in the supply of preforms of metallic particles that enable a reduction in the problems of the lack of alignment between the component and its substrate.

BRIEF DESCRIPTION OF THE DRAWINGS

Other characteristics, details and advantages will be more apparent from the additional description given hereafter by way of illustration and with reference to the drawings, in which:

FIG. 1 represents a diagram of the pretreatment process according to the invention, FIG. 2 represents a view of the pretreatment device according to the invention, FIG. 3 represents the filtration means according to one embodiment of the device according to the invention, FIG. 4 represents the desolvation means according to one embodiment of the device according to the invention, and FIG. 5 represents the compacting means according to one embodiment of the device according to the invention.

DETAILED DESCRIPTION OF PREFERRED EMBODIMENTS

The invention will now be described in greater detail. Hereafter the brazing of a component will be described but it goes without saying that the preform obtained according to the invention may be used to solder any type of component, for example, photonic, thermal or mechanical.

As indicated previously, the brazing composition used in the invention is constituted either by a brazing paste or by a suspension of metallic grains or particles or metallic oxalate in a solvent. This solvent may be, for example, ethylene glycol.

Primary brazing pastes essentially contain metallic particles as well as organic elements that must be removed as completely as possible from the paste before its use for the sintering of electronic components, for example.

The metallic particles are the essential elements of the paste. They will enable the sintering of the electronic component onto its substrate. The metallic particles of brazing pastes generally have a granulometry in the order of the micrometer or nanometer. To achieve good sintering, the metallic particles must have good thermal and electrical conductivity. Thus, any type of metallic particles could be used, in particular silver.

The organic components fulfil different functions: they act as a binder to give the paste cohesion and enable it to be applied by screen printing, for example, they act as a dispersant to prevent metal particles from sintering into the paste, as a thinner to fix the viscosity of the paste and as an anti-oxidant to prevent oxidation of the metal particles. It is these organic components in the form of binders or solvents that have to be eliminated.

Thus, the brazing paste comprises metallic particles with a granulometry in the order of the micrometer or nanometer, one or several binders and one or several solvents.

The particles or grains of silver or silver oxalate in the suspension are particularly recommended since they provide good thermal and electrical conductivity and they are note very sensitive to oxidation. Ideally, the particles or grains of silver or silver oxalate have a granulometry in the order of the micrometer or nanometer.

To sinter an electronic component, for example, it is necessary to remove as much solvent from the suspension or organic compounds from the brazing paste as possible beforehand.

FIG. 1 shows the different steps in the process according to the invention. The initial step only concerns the suspension and the following two steps concern the suspension itself and the brazing paste.

The initial step consists of a filtration step for the suspension grains of silver or silver oxalate. The purpose of this step is to quickly filter a large part of the solvent in which the grains are dispersed. Ideally, it is a filtration by suction through a membrane filter arranged over a suction device. It goes without saying that any other suction system may be employed in the invention. Thus, the grains of silver or silver oxalate are dispersed over the membrane filter either manually or by means of an automatic dispersion device and then the suction device is activated.

The membrane filter has pores that are of a diameter adapted to the granulometry of the metallic particles in the suspension. This enables the metallic particles of the suspension to be collected.

After this initial step, the brazing paste and suspension go through a desolvation phase and a compacting phase.

The desolvation step enables the solvents and binders present in the paste and any trace of the solvents still present in the suspension to be extracted. Thus, the brazing paste and the suspension are spread on a temperature-regulated heating plate. Ideally, this step is performed at a temperature of between 60° C. and 100° C., preferentially 80° C. Advantageously, the desolvation step may be performed in a vacuum thereby improving and accelerating the desolvation.

According to one embodiment of the invention, the vacuum is made around the brazing paste or suspension by means of a vacuum bell.

This step enables a desolvated brazing paste to be obtained that contains a reduced or negligible quantity of binders and a suspension that is practically solvent-free. The paste and suspension are deemed to almost exclusively contain particles of silver.

After this desolvation step, the desolvated brazing paste is in the form of a malleable mass and the suspension is in powder form. They must be given a suitable shape to be able to be used for the sintering of an electronic component.

Thus, a compacting step is performed on the desolvated sintering paste or suspension so as to obtain a preform of metallic particles able to be used in the sintering of an electronic component onto a substrate.

This step enables a preform to be obtained made of metallic particles or grains that is of a desired shape, thickness and density that may be adapted to its subsequent use. The preform thus made has a certain cohesion enabling its subsequent use on the substrate receiving the electronic component without deteriorating it.

According to one embodiment of the invention, the compacting step comprises the following phases.

A phase during which a cavity is filled with the desolvated brazing paste or suspension. The cavity defines the overall shape of the preform required to be used.

A phase during which the desolvated brazing paste or suspension is compacted in the cavity between a punch and a counter-punch arranged so as to obtain a preform having a predetermined shape, thickness and density. The position of the punch may be varied and/or the compacting pressure may be adjusted to need. It is thus possible for the density, shape and thickness of the preform obtained to be perfectly controlled and the shape of the preform to be adapted to the dimensions of the component to be assembled by sintering. Moreover, the preform obtained comprises strictly parallel upper and lower faces.

A phase to eject the preform from the cavity. At this stage in the process according to the invention, the preform is able to be used for the sintering of and electronic component and has sufficient mechanical strength to be handled manually or automatically without deterioration.

The preform obtained by the process according to the invention comprises metallic particles having a granulometry of the order of the micrometer or nanometer. According to one embodiment of the invention, the metallic particles are grains of silver of silver oxalate.

The invention also relates to a device to implement the process according to the invention.

FIG. 2 thus shows a device 1 to pretreat a brazing paste or suspension comprising metallic particles having a granulometry of the order of the micrometer or nanometer, one or several binders and one or several solvents.

The device 1 according to the invention enables a preform 3 of metallic particles to be obtained that is able to be used for the sintering of an electronic component onto a substrate. The device 1 is constituted by filtration means 4, desolvation means 5, compacting means 6 and transfer means 7. The device 1 may also comprise means to spread the primary brazing paste or suspension 2 as well as means to make available the preform 3 of metallic particles. It goes without saying that the quantity of paste or suspension to be deposited on the filtration means 4 is defined beforehand according to the needs and final dimensions required.

FIG. 2 shows the transfer means 7 enabling the filtered brazing paste or suspension 8 to be transferred from the filtration means 4 to the desolvation means 5. The transfer means 7 also enables the desolvated brazing paste or suspension 11 to be transferred from the desolvation means 5 to the compacting means 6 described hereafter.

According to one embodiment of the device according to the invention, the transfer means 7 comprise a scraper consisting of a thin blade mounted on a spring and moving between the different means 4, 5 and 6 of the pretreatment device 1.

It goes without saying that at the beginning of the cycle, the transfer means 7 are positioned before the filtration means 4 to take the paste or suspension and the preform from place to place.

FIG. 3 shows the filtration means 4 according to one embodiment of the device 1 according to the invention. The filtration means 4 are able to receive and filter the suspension 2 so as to obtain the filtered suspension 8. According to one embodiment of the device according to the invention shown in FIG. 3, the filtration means 4 comprise a membrane filter 9 able to receive the suspension 2 and suction means 10 to draw one or several solvents through the membrane filter. Advantageously, the membrane filter 9 has pores of a diameter that is adapted to the granulometry of the metallic particles in the suspension 2.

The membrane filter 9 enables the suspension 2 to be received and filtered. Its design is such that it prevents the metallic particles in the suspension 2 from passing through it. On the contrary, the membrane filter 9 lets the solvent pass through it by suction following arrow F using the suction means 10

FIG. 4 represents the desolvation means 5 according to one embodiment of the device according to the invention. The desolvation means 5 are able to receive and desolvate the filtered brazing paste or suspension 8 so as to obtain a desolvation brazing paste or suspension 11. The desolvation means 5 enable the solvent or solvents present in the brazing paste or suspension 8 to be removed.

According to one embodiment of the device 1 according to the invention shown in FIG. 4, the desolvation means comprise a heating plate 12 able to receive the filtered brazing paste or suspension 8 and a retractable vacuum bell 13.

The heating plate 12 receives and heats the filtered brazing paste or suspension 8 by heat transfer. Thus, the solvent or solvents present in the filtered brazing paste or suspension 8 evaporate according to the temperature. To accelerate the desolvation process, it is preferable to use a vacuum bell 13 that enables desolvation in a vacuum so as to accelerate the desolvation process of the brazing paste or suspension 8.

FIG. 5 shows compacting means 6 according to one embodiment of the invention. The compacting means 6 are able to receive and compress the desolvated brazing paste of suspension 11 so as to obtain a preform 3 made of metallic particles. The compacting means 6 enable, via the application of compressive forces on the desolvated brazing paste or suspension 11, to produce the preform 3 and to control its shape, density and thickness.

Thus, the brazing paste comprises metallic particles with a granulometry in the order of the micrometer or the nanometer, one or several binders and one or several solvents.

FIG. 5 shows the compacting means 6 that comprise a cavity 14, a punch 15 and a counter-punch 16. The cavity 14 is able to receive the desolvated brazing paste or suspension 11 and its shape determines the final shape of the preform 3. Observation of the Figure shows that the cavity 14 has been filled and the excess composition has been removed by the scraper 7.

The punch 15 and counter-punch 16 are arranged so as to compress the desolvated brazing paste or suspension 11 inside the cavity so as to produce a preform made of metallic particles with a predetermined shape, thickness and density. The forces exerted by the punch and counter-punch 16 determined the density and thickness of the preform 3.

Lastly, after compression, the transfer means 7 enable the preform 3 to be ejected from the compacting means 6 and ensure its transfer to a handling zone. The metallic particle preform is then able to be used in the sintering of an electronic component.

The full advantage of the invention can be seen in that it enables a brazing operation to be carried out using a preform that is composed almost 100% of metallic grains. Using this method avoids all known treatments of the brazing composition made in the presence of the electronic component. Furthermore, using the preform enables continuous brazing to be performed thereby limiting the time required in the presence of the electronic component.

The process according to the invention enables great flexibility of use in the sintering process, since it is possible to quickly produce the preforms whose dimensions are adapted to the components to be sintered, and then to perform the brazing. It can be seen that this sintering can be carried out continuously by associating the device according to the invention with a sintering station.

What is claimed is:

1. A pretreatment process for a brazing composition that comprises particles with a granulometry in the order of the micrometer or nanometer, one or several binders and one or several solvents, said process comprising:
    extracting said one or several binders and said one or several solvents from said brazing composition, so as to obtain a particulate brazing composition free from said one or several binders and said one or several solvents, then compacting said particulate brazing composition by:
       filling a cavity with said particulate brazing composition,
       compressing said particulate brazing composition in said cavity between a punch and a counter-punch arranged in such a way as to obtain a preform made of the particles having a predetermined shape, thickness, and density, and
       ejecting said preform of the particles from said cavity,
    said preform being able to be subsequently used for sintering of an electronic, photonic, thermal or mechanical component onto a substrate,
    wherein the particles are metallic particles or metallic oxalate particles.

2. The pretreatment process according to claim 1, wherein said extracting of said one or several binders and said one or several solvents is performed in a vacuum and at a temperature of between 60° C. and 100° C.

3. The pretreatment process according to claim 1, wherein said particles are grains of silver or grains of silver oxalate.

4. The pretreatment process according to claim 1, wherein said extracting of said one or several binders and said one or several solvents is performed in a vacuum and at a temperature of 80° C.

5. The pretreatment process according to claim 1, wherein said particles are silver particles.

6. The pretreatment process according to claim 1, wherein said particles are silver oxalate particles.

7. The pretreatment process according to claim 1, wherein said brazing composition is represented either by a brazing paste, or by a suspension of the particles in suspension in a solvent.

8. The pretreatment process according to claim 7, wherein said suspension of the particles is subjected to a prior filtration step through a membrane filter arranged over a suction device.

* * * * *